(12) United States Patent
Mosberger (10) Patent No.: US 8,214,819 B2
(45) Date of Patent: Jul. 3, 2012

(54) DETERMINING CALL COUNTS IN A PROGRAM

(75) Inventor: David Mosberger, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1646 days.

(21) Appl. No.: 10/886,705

(22) Filed: Jul. 9, 2004

(65) Prior Publication Data

US 2006/0020918 A1    Jan. 26, 2006

(51) Int. Cl.
*G06F 9/44* (2006.01)
(52) U.S. Cl. ........ 717/163; 717/130; 717/133; 717/154; 717/157
(58) Field of Classification Search .................. 717/163, 717/130, 133, 154, 157
See application file for complete search history.

(56) References Cited

U.S. PATENT DOCUMENTS

| | | | | |
|---|---|---|---|---|
| 5,740,443 | A * | 4/1998 | Carini | 717/133 |
| 5,768,500 | A * | 6/1998 | Agrawal et al. | 714/47 |
| 5,950,003 | A * | 9/1999 | Kaneshiro et al. | 717/130 |
| 6,026,234 | A * | 2/2000 | Hanson et al. | 717/133 |
| 6,029,004 | A * | 2/2000 | Bortnikov et al. | 717/158 |
| 6,049,666 | A * | 4/2000 | Bennett et al. | 717/130 |
| 6,126,329 | A * | 10/2000 | Bennett et al. | 717/127 |
| 6,175,956 | B1 * | 1/2001 | Hicks et al. | 717/114 |
| 6,282,707 | B1 * | 8/2001 | Isozaki | 717/157 |
| 6,334,210 | B1 * | 12/2001 | Miura et al. | 717/128 |
| 6,360,360 | B1 * | 3/2002 | Bates et al. | 717/160 |
| 6,934,935 | B1 * | 8/2005 | Bennett et al. | 717/127 |
| 7,093,234 | B2 * | 8/2006 | Hibbeler et al. | 717/124 |
| 2002/0138788 | A1 * | 9/2002 | Yenne et al. | 714/38 |
| 2003/0041316 | A1 * | 2/2003 | Hibbeler et al. | 717/130 |
| 2003/0117971 | A1 * | 6/2003 | Aubury | 370/321 |
| 2005/0283765 | A1 * | 12/2005 | Warren et al. | 717/131 |

OTHER PUBLICATIONS

"Monster User Guide" Architecture and Performance Group, Apple Computer, Inc., Oct. 2002.*
"Shikari 2.5 User Guide" Architecutre and Performance Group, Apple Computer, Inc., Oct. 2002.*
"Sampler" Development Tools Help Menu, Apple Computer, Inc., Dec. 2002.*
"A comparative Study of Static and Profile-Based Heuristics for Inlining" by Matthew Arnold, Stephen Fink, Vivek Sarkar, Peter F. Sweeney 2000.*
Liblit et al., "Bug Isolation via Remote Program Sampling", Jun. 9-11, 2003.*
Vitter, "Random Sampling with a Reservoir", 1985.*
McCanne et al., "A Randomized Sampling Clock for CPU Utilization Estimation and Code Profiling", 1993.*
Zhuang et al., "Accurate, Efficient, and Adaptive Calling Context Profiling", 2006.*
Graham, S. L. et al., "GPROF: A Call Graph Execution Profiler", University of California, Berkeley. 1982.
Srivastava, A. et al., "ATOM: A System for Building Customized Program Analysis Tools", Mar. 1994, WRL Research Report 94/2. Mar. 1994.

* cited by examiner

*Primary Examiner* — Phillip Nguyen (57) ABSTRACT

Function calls for a program are sampled to determine call counts in the program. The call counts are determined based on sampled function calls collected during sampling intervals.

33 Claims, 6 Drawing Sheets

DETERMINING CALL COUNTS IN A PROGRAM

TECHNICAL FIELD

The technical field relates generally to computer programs. More particularly, the technical field relates to determining call counts in a program.

BACKGROUND

Program analysis tools are important for understanding program behavior. Computer architects need such tools to evaluate how well programs will perform on a particular architecture. Software writers need such tools to analyze and optimize their programs and identify critical pieces of code. Compiler writers often use such tools to find out how well, for example, their instruction scheduling or branch prediction algorithm is performing or to provide input for profile-driven optimizations.

Conventional program analysis tools may evaluate various program metrics for discovering performance bottlenecks, such as routines and loops that consume the most CPU time, regions of code that spend a significant amount of their CPU time waiting on memory, loops that generate excessive cache misses, uneven distribution of work across threads in parallel regions, lack of effective parallelism in a loop or a routine, etc.

One type of metric that may be collected and evaluated is a call count metric. A call count is the number of times a particular function is called in total in a program or from a particular other function in the program. For example, a program includes three functions A, B, and C. During the execution of the program, the function A calls the function C five times and the function B calls the function C ten times. Thus, the call count for the function C is fifteen.

Function as used herein refers to a set of instructions that compute a value or take an action, such as printing or reading a character value. Functions are also referred to as procedures and subroutines. A program being monitored may include several functions and each function may call other functions or itself. During program optimization, the call count and functions performing the most number of calls may be evaluated to identify areas of code that can be optimized to increase processing efficiency and reduce execution time.

Figure 6:
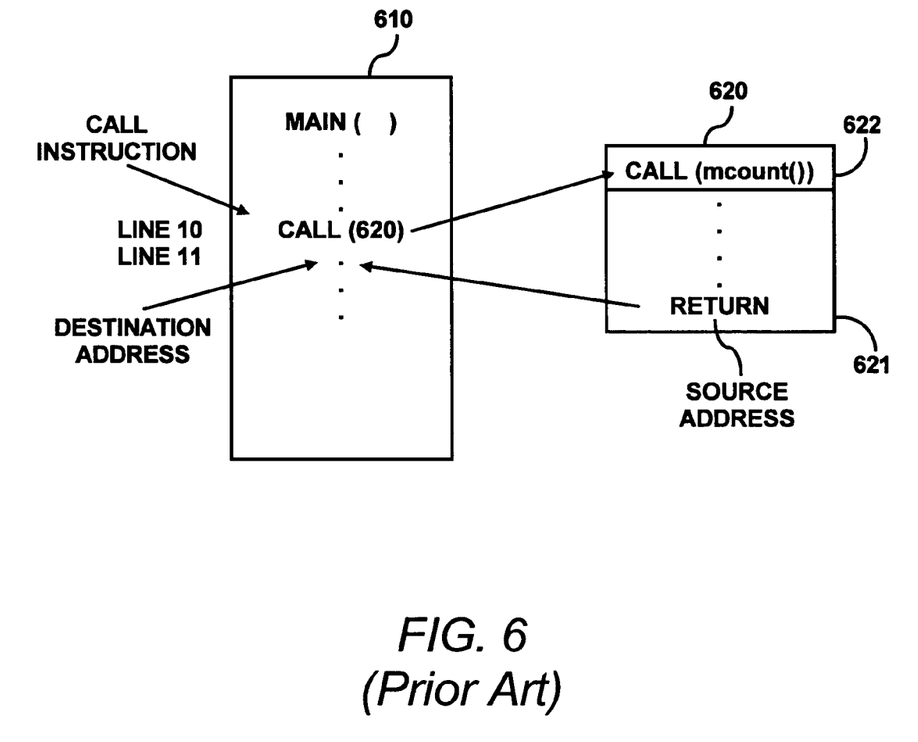
FIG. 6 illustrates a conventional function call.

FIG. 6 illustrates calling a function, i.e., a function call, in a program. The function 610 is being executed. The function 610 may be the main function in a C program. Line 10 includes a call instruction which calls the function 620. The called function 620 is executed and includes a return instruction 621 designating the return to the main function 610 in this example.

The conventional technique for collecting a call count is to include special code in the program which records each call as it occurs. For example, most C compilers support a command-line option to insert code including a call to a special function, e.g., mcount( ), which counts each call. This inserted code is typically added at the beginning of each subroutine and is shown as 622 in the beginning of the function 620. The function mcount( ), which is called by the code 622, may increment a counter associated with the source address and/or the source/destination address pair for each return or call instruction.

For example, referring to the function 620, the source address is the address of the return instruction 621, which is executed in this example to return to the main function 610. The destination address is the address of the next line to be executed, which may be line 11 in the function 610. By monitoring the source and destination addresses, the call count as well as a function making a call counted in the call count can be determined. Conventional program analysis tools may add the code 622 when the program is initially being compiled, at link-time, or dynamically at runtime via code patching.

All of these conventional programming analysis tools have in common the requirement of adding code, such as the code 622, to a program to determine a call count. However, adding the code 622, even if done automatically by a compiler, may affect the proper operation of the program being monitored. Furthermore, special privileges required for adding code to the program may not be available, and the additional code 622 increases execution time of the program.

SUMMARY

According to an embodiment, call counts are determined for a program. Function calls for the program are sampled based on a sampling interval. The call counts are determined based on the sampled function calls collected during sampling intervals.

BRIEF DESCRIPTION OF THE DRAWINGS

Embodiments are illustrated by way of example and without limitation in the accompanying figures in which like numeral references refer to like elements, and wherein.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Figure 1:
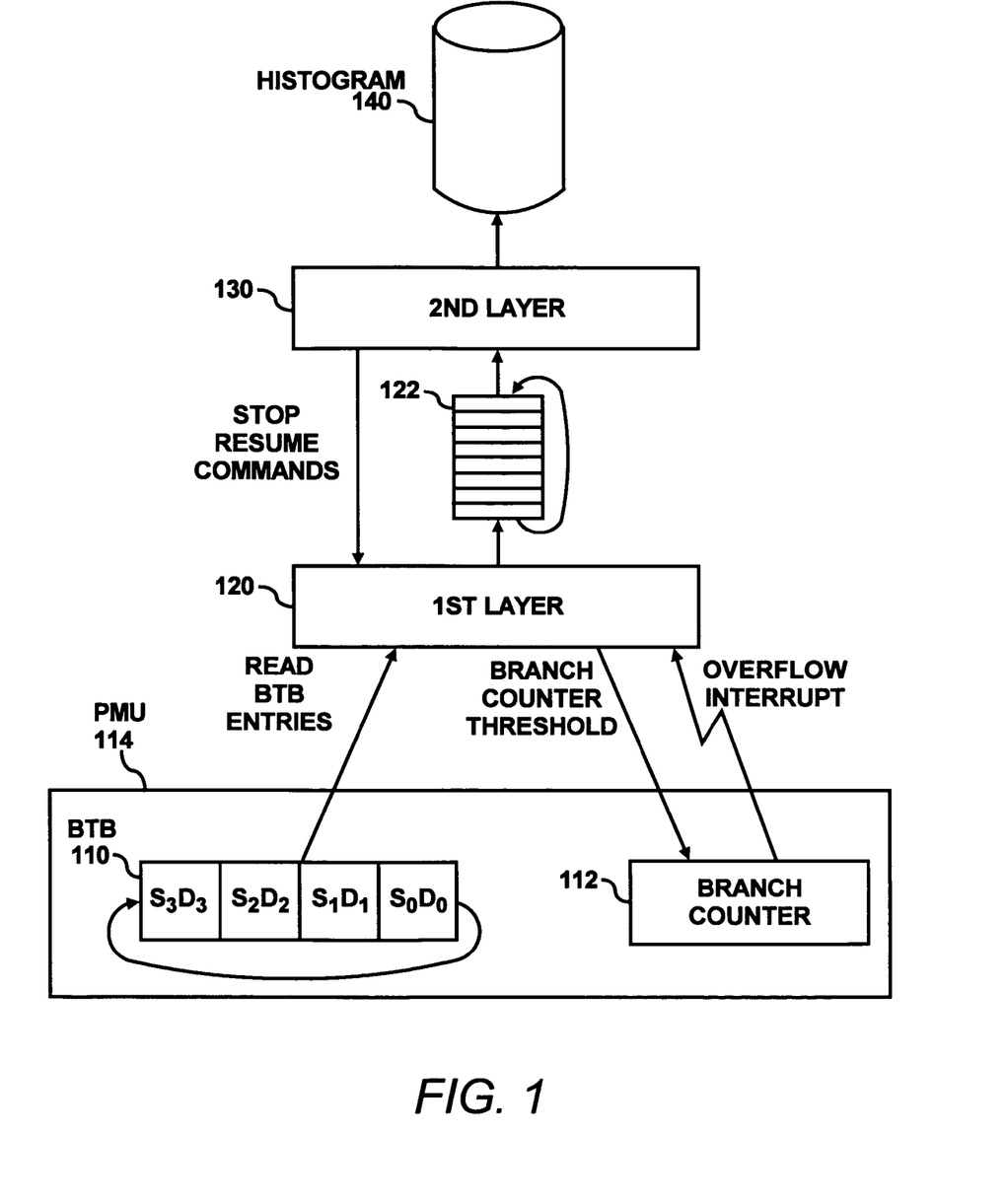
FIG. 1 illustrates a block diagram of a system for sampling call counts, according to an embodiment.

FIG. 1 illustrates a system 100 for sampling function calls executed in a program, according to an embodiment. The system 100 may be used as a program analysis tool operable to analyze call counts for functions called in the program being monitored. The system 100 includes a branch-trace buffer (BTB) 110 and a branch counter 112. The branch counter 112 stores the number of return instructions executed for a function in the program being monitored by the system 100, and the BTB 110 stores entries for each executed return instruction. Each entry in the BTB 110 may include the source and/or the destination addresses for each return instruction, shown in FIG. 1 as $S_0D_0 \ldots S_nD_n$.

The system 100 also includes a first software layer 120 controlling the sampling of the BTB 110 and a second software layer 130 controlling the sampling interval for sampling the BTB 110. The second software layer 130 also determines call counts for the program.

A call count is the number of times a particular function is called in total while the program is being monitored. Instead of counting each function call, the second software layer 130 uses the sampled function calls for the function to determine the approximate call count for that function. A call count may also include an edge call count, which includes the number of times a particular function calls the function being monitored. The sampled function calls may also be used to determine an edge count or other known variations of a call count.

The BTB 110 can be programmed to sample function calls for the program being monitored. The second software layer 130 is operable to generate a histogram 140 including call counts for different functions in the program. The histogram 140 can be used to analyze which functions are performing the function calls and is generated based on the source and/or the destination addresses sampled from the BTB 110. Also, the program monitoring system shown in FIG. 1 may be turned on and off by a user as needed, such that a program can be monitored as needed.

The BTB 110 is a hardware buffer. The BTB 110 shown in FIG. 1 is a circular buffer that stores up to four entries as an example. Larger or smaller buffers may be used. In one embodiment, the BTB 110 is provided on a processor chip (not shown) and is used to monitor the performance of the processor. For example, processor chips may include a performance monitoring unit (PMU) 114 including several registers and counters for monitoring the performance of the processor. Intel Itanium 2 is one example of a processor including a PMU. Some of the registers of the PMU 114 are allocated as the BTB 110.

Conventionally, the BTB 110 in the PMU 114 is used for branch-path analysis. According to an embodiment, the BTB 110 is used for sampling function calls to determine a call count.

As described above, the BTB 110 stores entries for each return instruction for each function call when the program is being monitored. In other embodiments, the BTB 110 may store entries for call instructions, return instructions, or both for the functions. Certain processor chips, such as the Intel Itanium 2, may have a BTB 110 that can sample only return instructions. However, for the purpose of sampling function calls, the call instructions, the return instructions, or both may be sampled. If the BTB 110 is operable to sample on both call and return instructions, pathological edge traversals that can result from compiler optimizations, e.g., tail-call optimization, or from hand-coded machine code may be determined. Also, the BTB 110 may be able to store entries for multiple calls, such as when a function may call multiple functions. In this case, all the function calls are counted to improve upon the accuracy of the profile of the program being monitored.

The branch counter 112 is a hardware counter. In one embodiment, the branch counter 112, like the BTB 110, may be provided in the PMU 114. The branch counter 112 counts the number of return instructions or call instructions executed for a function in the program being monitored and may be programmed to generate an interrupt upon reaching a predetermined counter-value, herein referred to as the branch counter threshold.

The first software layer 120 and the second software layer 130 control the sampling of the BTB 110. Based on the sampling of the BTB 110, a call count for a function is determined. An application program interface (API), such as Hewlett-Packard's Perfmon or the Itanium Linux Perfmon, may be used to program the BTB 110 to store entries for function calls and for programming the branch counter 112 described in detail below. The Perfmon API includes libraries which allow a programmer to utilize a BTB and a branch counter in a PMU as desired. In one embodiment, the first software layer 120 is provided in a kernel, the second software layer 130 is provided in an application, e.g., called q-syscollect, and the Perfmon API is used by the second layer 130 for programming the kernel to perform the function of the first software layer 120 and to return data from the first layer 120 to the second layer 130.

The first software layer 120 and the second software layer 130 do not necessarily require inserting code in the program being monitored to sample function calls. Thus, unlike the code 622 shown in FIG. 6, which is inserted in the program, the first software layer 120 and the second software layer 130 provide a program analysis tool that is substantially not intrusive on the program being monitored. That call counts can be obtained without any changes to the program. This can result in more robust and proper operation of the program being monitored, and the program analysis tool is easier to apply because no changes are required to existing programs. Furthermore, the overhead for collecting call counts can be better controlled since the sampling-rate is selected independently of how frequently a particular function is being called.

To avoid sampling bias (systematic errors) when sampling function calls to determine call counts, the first layer 120 adjusts the sampling interval. For example, the first layer 130 randomly selects a value from within a predetermined range and programs the branch counter 112 with that value. This value is the branch counter threshold. When the branch counter 112 reaches the branch counter threshold, such as when the number of return or call instructions since the last reset of the branch counter 112 is greater than or equal to the branch counter threshold, an interrupt is generated by the branch counter 112. Then, the first software layer 120 reads the BTB 110 and stores the entries from BTB 110 in the buffer 122. The buffer 122 may be much larger than the BTB 110, e.g., storing hundreds or thousands of entries depending on the typical number of branches in the programs being monitored. Randomization of the sampling interval may be used to avoid sampling bias. For example, if the program being monitored repeatedly called 10 different functions and the sampling interval is 10, then the sampling results would indicate that the same function is always being called. By randomizing the sampling interval, such sampling bias may be minimized.

In the embodiment shown in FIG. 1, the BTB 110 stores four entries. Thus, the most recent four entries are sampled at the time the first software layer 120 detects the interrupt and the sampled entries are stored in the buffer 122. The sampling interval is adjusted by varying the branch counter threshold. To vary the branch counter threshold, the first software layer 120 may randomly select a new value from a predetermined range which may be provided by the second software layer 130.

The second software layer 130 controls the range of values for the branch counter threshold and determines a call count for each called function based on the entries stored in buffer 122. For example, the second software layer 130 reads the buffer 122 at the end of a predetermined period of time. The predetermined period of time is associated with a desired call count rate, i.e., a desired number of function calls to be collected within the predetermined period of time. For example, a desired call count rate may be 1000 samples per second. The second software layer 130 reads the entries from the buffer 122 every second, which is the predetermined period of time in this example. If the buffer 122 includes more than 1000 samples or less than 1000 samples, then the second software layer 130 instructs the first software layer 120 to change the range of possible values for the branch counter threshold. For example, the second software layer 130 instructs the first software layer 120 to use a range for the branch counter threshold whose mean value is increased or decreased, thus increasing or decreasing the sampling rate of the BTB 110 to be more congruent with the desired call count rate.

The second software layer 130 also determines a call count for a function in the program. For example, the second software layer 130 sums the number of entries in the buffer 122 to determine the call count. This may include summing the number of source addresses, summing the number of destination addresses, or summing the number of pairs of source and destination addresses for a particular function. This process is repeated for each function to determine the call counts for the program. The second layer 130 may also be used to generate a histogram 140 of the source and destination addresses from the entries stored in the buffer 122. The histogram 140 may be used to determine which functions are making the most function calls and to determine the call counts. As described in detail below, the call counts are a function of the sampled function calls which are stored in the buffer 122 over one or more time periods, which may include a plurality of sampling intervals. Also, each sampled function call may be weighted to determine a call count for a particular function. For example, if the sampling interval is set to 10 function calls. A function call sampled during or at the end of that sampling interval is weighted by 10.

Figure 2:
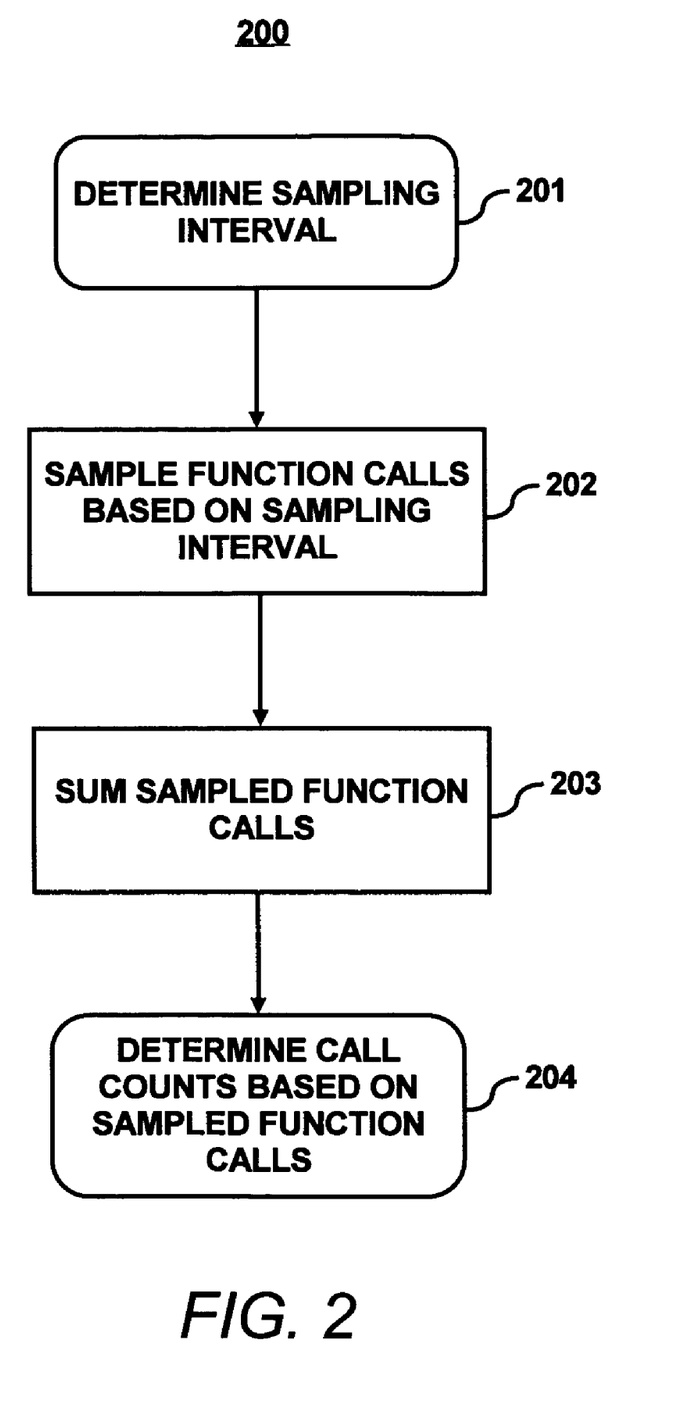
FIG. 2 illustrates a flow chart of a method for determining call counts, according to an embodiment.

FIG. 2 illustrates a flow chart of a method 200 for determining call counts, according to an embodiment. The method 200 is described with respect to the system 100 shown in FIG. 1 by way of example and not limitation. At step 201, the first software layer 120 and the second software layer 130 determine a sampling interval for sampling the functions calls for a program. The first software layer 120 may randomly select a sampling interval or substantially randomly select a sampling interval, such as randomly selecting a sampling interval within a range received from the second software layer 130. The methods performed by the first and second software layers 120 and 130 are described in further detail with respect to FIGS. 4 and 5.

At step 202, the first software layer 120 samples function calls based on the sampling interval. For example, at the end of the sampling interval, the first software layer 120 reads the entries in the BTB 110 shown in FIG. 1 and stores the entries in the buffer 122. The BTB 110 may not be large enough to store entries for each function call executed during the sampling interval. Thus, the most recent function calls stored in the BTB 110 are sampled.

At step 203, the second software layer 130 sums the sampled function calls collected during a predetermined period of time. The predetermined period of time may be larger than the sampling interval. In one example, the predetermined period of time may include several sampling intervals. Summing the sampled function calls may include reading the entries stored in the buffer 122 after the predetermined period of time. The buffer 122 may then be cleared and read again.

At step 204, the second software layer 130 determines call counts for the program based at least on the sampled functions calls collected during the predetermined period of time. In one example, the histogram 140 is generated based on the sampled function calls collected during several time periods and the call counts are determined based on the sampled function calls collected during the several time periods. Also, each sampled function call may be weighted to determine the call counts.

For example, the second software layer 130 reads the buffer 122 at the end of a predetermined period of time. The predetermined period of time is associated with a desired call count rate. For example, a desired call count rate may be 1000 samples per second, and thus, the second software layer 130 reads the entries from the buffer 122 every second. The second software layer 130 sums the number of entries in the buffer 122 to determine the number of collected, sampled, function calls for the predetermined period of time. This may include summing the number of source addresses, summing the number of destination addresses, or summing the number of pairs of source and destination addresses for each function call. The entries of the buffer 122 may be read by the second software layer 130 over several periods of time to determine the call count. For example, the second software layer 130 generates a histogram 140 of the source and destination addresses from the entries read from the buffer 122 over several periods of time. The number of time periods may be designated by a user and can be less than or equal to the complete duration of the program being monitored. The histogram 140 may be used to determine which functions are making the most function calls and for determining the call counts.

Figure 3:
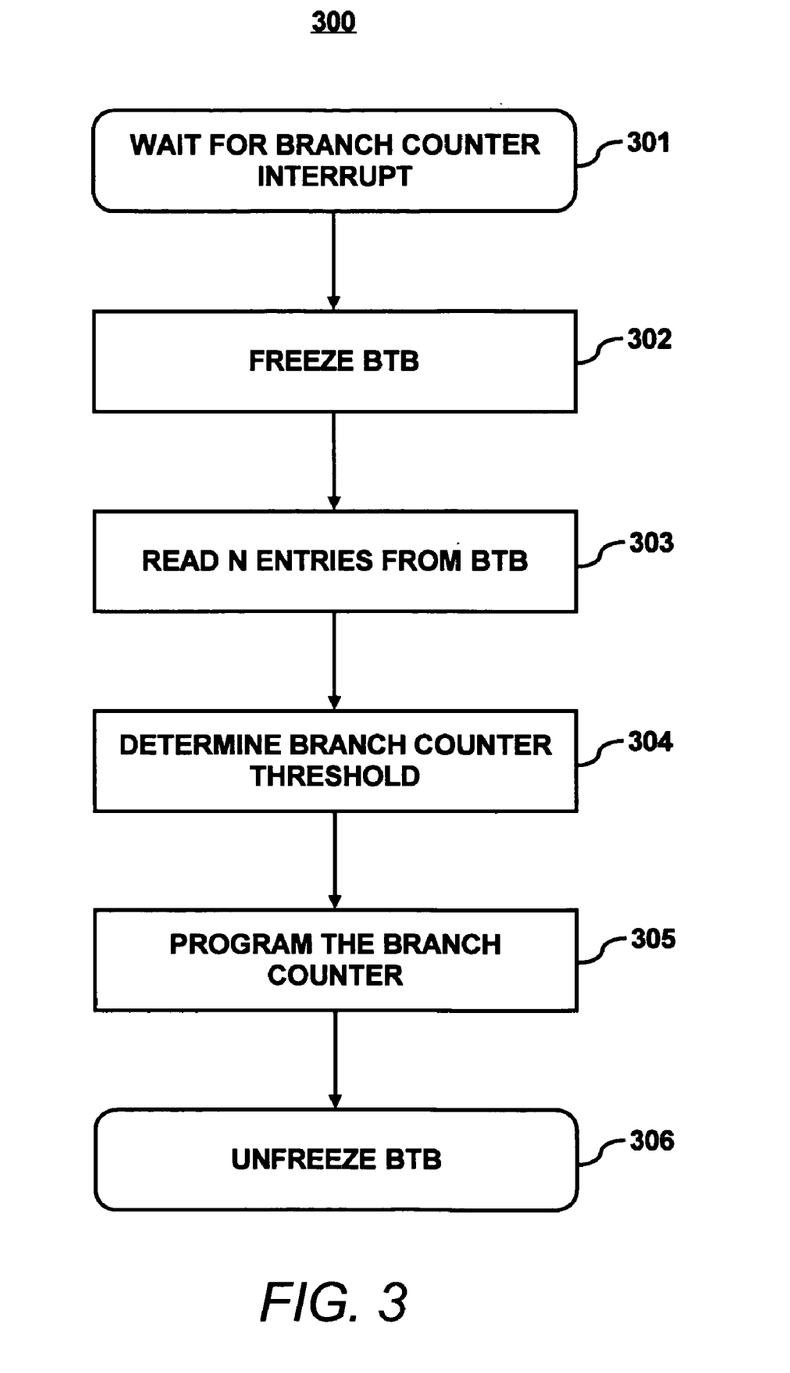
FIG. 3 illustrates a flow chart of a method for sampling call counts using the first layer shown in FIG. 1, according to an embodiment.

FIG. 3 illustrates a method 300 for sampling function calls using a branch trace buffer, according to an embodiment. The steps of the method 300 are described with respect to the system 100 shown in FIG. 1 by way of example and not limitation. Also, the method 300 includes one or more steps that may be performed by the first software layer 120. Some of these steps are substeps of the steps 201-203 described with respect to FIG. 2.

At step 301, the first software layer 120 waits for a branch counter interrupt generated in response to the branch counter 112 reaching the branch counter threshold. The branch counter threshold is used to select the sampling interval for sampling the BTB 110. For example, when the branch counter 112 reaches the branch counter threshold, an interrupt is generated. The first software layer 130 detects the interrupt and the PMU 114 freezes the BTB 110 at step 302.

At step 303, the first software layer 120 reads up to N entries from the BTB 110, wherein each entry is associated with a function call, and stores the entries in the buffer 122. N is the number of entries that can be stored in the BTB 110. In the embodiment shown in FIG. 1, the BTB 110 stores four entries. Thus, the most recent four entries are sampled at the time the first software layer 120 detects the interrupt and the sampled entries are stored in the buffer 122.

At step 304, the first software layer 120 determines the next value for the branch counter threshold which is programmed into branch counter 112. The branch counter threshold may be randomly selected from a range specified by the second software layer 130 based on a desired call count rate. At step 305, the first software layer 120 programs the branch counter 112 with the new branch counter threshold and unfreezes the BTB at step 306. Sampling is then resumed. Programming the branch counter 112 may include resetting the branch counter 112 and setting the new branch counter threshold as the value where an interrupt is generated when the branch counter 112 reaches the branch counter threshold. The branch counter 112 is incremented for each function call.

Figure 4:
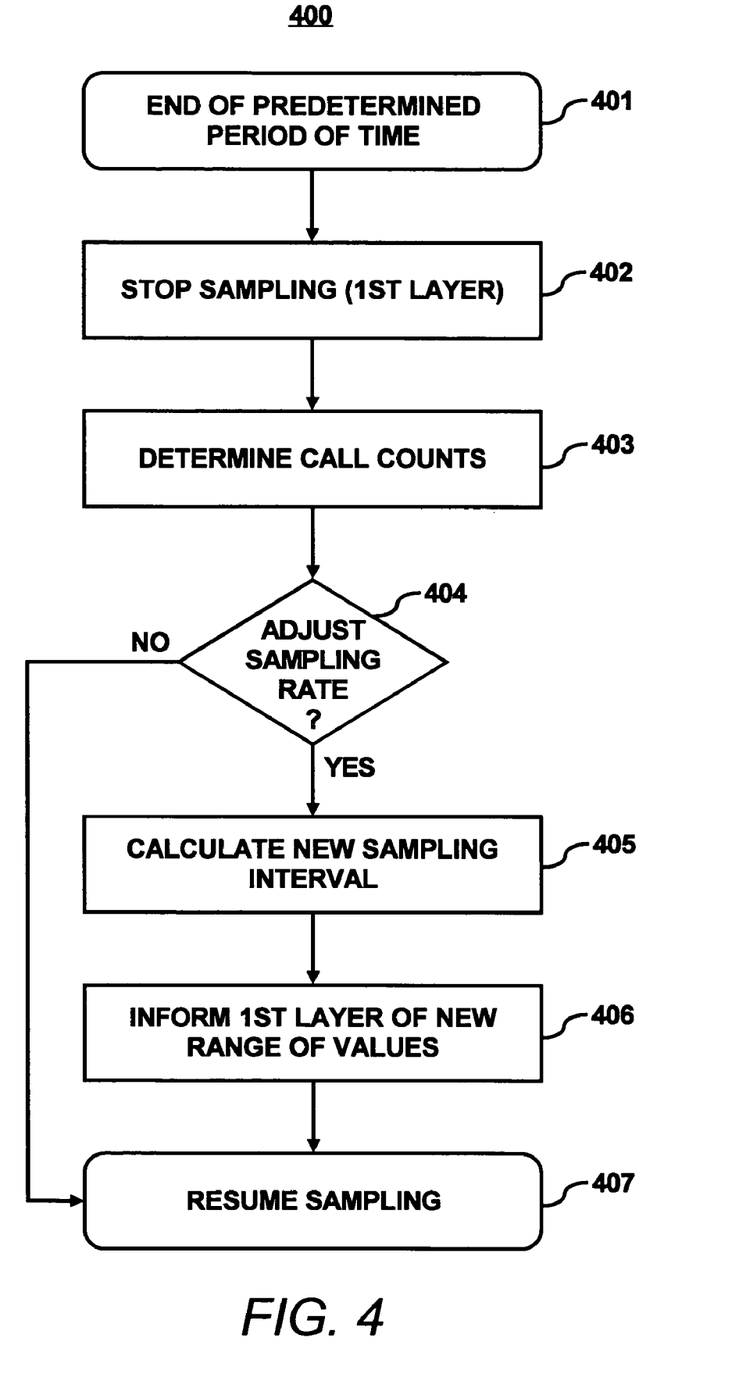
FIG. 4 illustrates a flow chart of a method for determining call counts using the second layer shown in FIG. 1, according to an embodiment.

FIG. 4 illustrates a method 400 for determining call counts and adjusting a sampling interval, according to an embodiment. The steps of the method 400 are described with respect to the system 100 shown in FIG. 1 by way of example and not limitation. Also, the method 400 includes one or more steps that may be performed by the second software layer 130. Some of these steps are substeps of the steps 201-203 described with respect to FIG. 2.

At step 401, the second software layer 130 waits for the end of a predetermined period of time associated with a call count rate. For example, the second software layer 130 reads the entries in the buffer 122 every second, i.e., the predetermined period of time in this example. At step 402, the second software layer 130 instructs the first software layer 120 to stop sampling the BTB 110. At step 403, the second software layer 130 reads the entries from the buffer 122 and determines the call counts. For example, the second software layer 130 sums the number of entries in the buffer 122 for each function to determine the call count for each function called in the program. This may include summing the number of source addresses, summing the number of destination addresses, or summing the number of pairs of source and destination addresses for each function call and possibly weighting the sampled function calls. The buffer 122 may be reset after reading the entries from the buffer 122.

At step 404, the second software layer 130 determines whether the sampling interval used to sample the BTB 110 needs to be adjusted. For example, a desired call count rate $C_D$ is compared to an actual call rate $C_A$. Equation 1 illustrates one example of a comparison between $C_A$ and $C_D$.

$$|C_A-C_D|>T$$ Equation 1:

The absolute value of the difference between $C_A$ and $C_D$ is compared to a threshold T. If the difference exceeds the threshold, then the sampling interval for sampling the BTB 110 is calculated at step 405. For example, $C_D$ is 1000 samples per second and $C_A$ is 100 samples collected in the buffer 122 during the 1 second period of time. The threshold is set, for example, at 200. In this example, T is exceeded, and a new sampling interval is calculated. The new sampling interval may be a function of $C_A$ and $C_D$. In this example, $C_A*10=C_D$. Thus, the new sampling interval may be set at $1/10^{th}$ of the current sampling interval.

At step 406, the second software layer 130 informs the first software layer 120 of the new range of values that may be used for branch counter 112. In one example, the new range of values is selected by the second software layer 130 such that the mean value of the range matches the desired new sampling interval. Then, the first software layer 120 randomly picks a counter value from the new range, such that the BTB 110 is sampled at the new sampling rate. At step 407, the first software layer 120 resumes sampling of the BTB 110 at the new sampling rate if the first software layer 120 stopped sampling or froze the BTB 110 to wait for the new sampling rate from the second software layer 130. At step 404, if the second software layer 130 determines that the sampling rate need not be adjusted, sampling is resumed at step 407.

Figure 5:
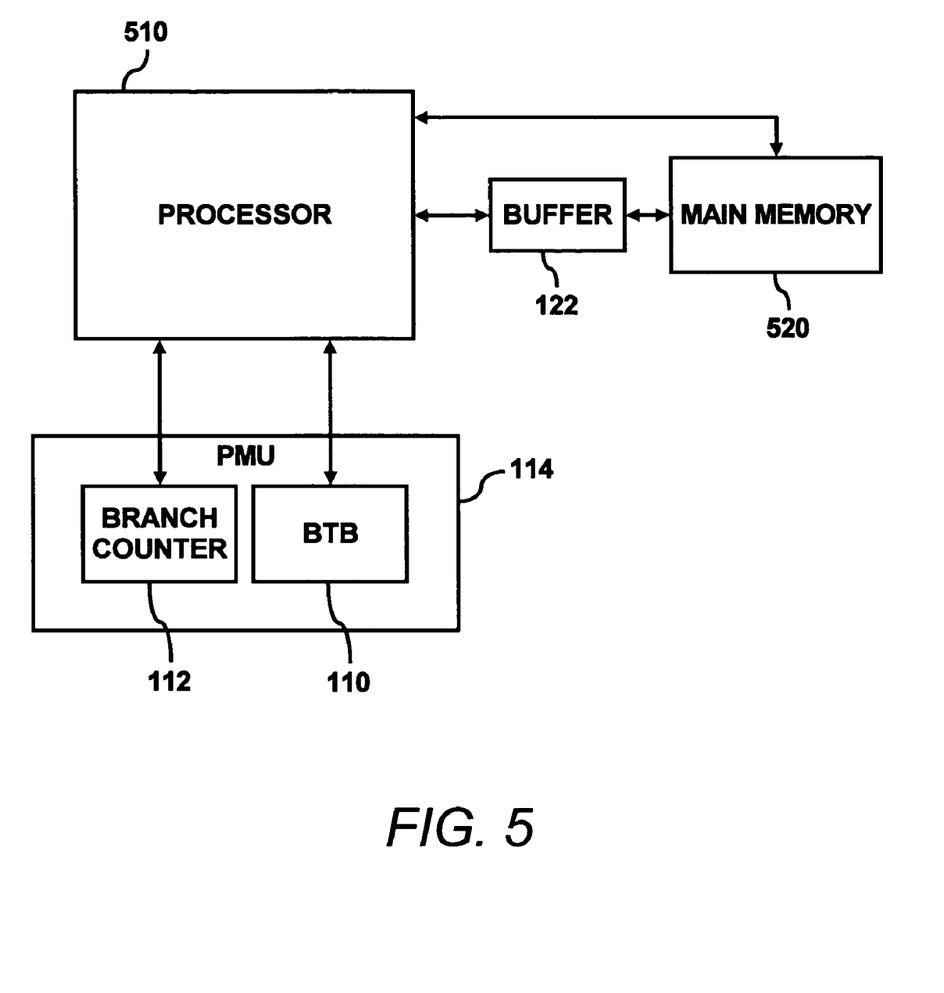
FIG. 5 illustrates a block diagram of a hardware system, according to an embodiment.

FIG. 5 illustrates a hardware system operable to perform the methods 200-400 and including the hardware components shown in FIG. 1, according to an embodiment. It will be apparent that variations and other architectures may be used. A processor 510 is connected to the PMU 114, a main memory 520, and the buffer 122. The main memory 520 may be used as the buffer 122, and the main memory 520 may store the first and second software layers 120 and 130, which are executed by the processor 510. For example, the first and second software layers 120 and 130 may be part of a kernel which is stored in the main memory 520. Generally, the software layers 120 and 130 are stored in a computer readable medium, which may be provided in many forms, such as RAM, ROM, etc. If the first and second software layers 120 and 130 are provided in a kernel, the first and second software layers 120 and 130 may be stored in non-volatile memory. The processor 510 is connected to the PMU 114, and programs the branch counter 112 with a branch counter threshold for setting the sampling interval. The processor 510 also reads function call entries from the BTB 110 and stores the entries in the buffer 122. The processor 510 generates the histogram 140 shown in FIG. 1 and determines call counts for the program monitored.

What has been described and illustrated herein are the embodiments. The terms, descriptions and figures used herein are set forth by way of illustration only and are not meant as limitations. Those skilled in the art will recognize that many variations are possible within the spirit and scope of the embodiments, which intended to be defined by the following claims and their equivalents in which all terms are meant in their broadest reasonable sense unless otherwise indicated.

What is claimed is:

1. A method of determining call counts in a program without adding additional code into the program, the method comprising:
    determining a sampling interval for a function of a plurality of functions called in the program;
    programming a branch counter to count a number of executed function calls for the function in the program and to generate an interrupt upon reaching the sampling interval;
    sampling function calls from the function calls only for the function in response to the interrupt; and
    determining the call counts for the function based on the sampled function calls.

2. The method of claim 1, wherein determining the call counts based on the sampled function calls further comprises:
    determining the call counts based on function calls sampled during a plurality of sampling intervals; and
    randomly selecting each of the plurality of sampling intervals.

3. The method of claim 2, wherein randomly selecting each of the plurality of sampling intervals further comprises:
    randomly selecting an interval length for each of the plurality of sampling intervals within a predetermined range.

4. The method of claim 3, further comprising:
    determining the predetermined range based on whether a number of sampled function calls collected during a predetermined period of time is greater than or less than a threshold.

5. The method of claim 1, further comprising:
    determining whether a sum of sampled function calls collected during a predetermined period of time varies from a desired number of function calls to be collected during the predetermined period of time; and
    increasing or decreasing the sampling interval in response to the sum of sampled function calls varying from the desired number of function calls.

6. The method of claim 5, wherein determining whether a sum of sampled function calls collected during a predetermined period of time varies from a desired number of function calls to be collected during the predetermined period of time further comprises:
    determining whether the sum of sampled function calls collected during the predetermined period of time varies from the desired number of function calls to be collected during the predetermined period of time by a predetermined amount; and increasing or decreasing the sampling interval further comprises increasing or decreasing the sampling interval in response to the sum of sample function calls varying by the predetermined amount from the desired number of function calls.

7. The method of claim 6, wherein increasing or decreasing the sampling interval further comprises:
determining a difference between the sum of sampled function calls and the desired number of function calls; and
increasing or decreasing the sampling interval by an amount associated with the difference.

8. The method of claim 1, further comprising:
randomly selecting the sampling interval from a range of values.

9. The method of claim 1, wherein determining the call counts based on the sampled function calls further comprises:
determining the call counts in the program based on sampled function calls collected during a plurality of time periods, wherein each of the plurality of time periods comprises a plurality of sampling intervals.

10. The method of claim 9, further comprising:
generating a histogram from the sampled function calls collected during the plurality of time periods.

11. The method of claim 1, wherein sampling function calls based on a sampling interval further comprises:
sampling function calls using a branch trace buffer.

12. The method of claim 11, wherein sampling function calls using a branch trace buffer further comprises:
storing an entry in the branch trace buffer for each function call executed during the sampling interval; and
reading entries from the branch trace buffer at an end of the sampling interval.

13. The method of claim 12, wherein the entries read from the branch buffer are associated with a most recent number of function calls executed during the sampling interval.

14. The method of claim 13, wherein each entry comprises:
information associated with a return instruction, a call instruction, or both a return instruction and a call instruction.

15. The method of claim 11, wherein sampling function calls using a branch trace buffer further comprises:
programming the branch counter with a random value; and
sampling function calls using the branch trace buffer in response to the branch counter reaching the random value.

16. The method of claim 15, further comprising:
determining whether a desired number of function calls are collected within a predetermined time; and
selecting the random value from a range, wherein the range is adjusted based on whether a number of collected function calls are greater than or less than the desired number of functions calls to be collected within the predetermined period of time.

17. A method of sampling function calls for a function called in a program without adding additional code into the program, the method comprising:
programming a branch counter to generate an interrupt upon reaching a branch counter threshold;
using the branch counter to count a number of executed function calls for the function in the program, wherein the function is a function of a plurality of functions called in the program;
storing entries for the function calls for the function in a branch trace buffer;
sampling entries only for the function calls of the function stored in the branch trace buffer in response to the interrupt from the branch counter upon reaching the branch counter threshold; and
determining call counts for the function based on the sampling of the entries.

18. The method of claim 17, wherein programming a branch counter further comprises:
programming the branch counter with the branch counter threshold, wherein the branch counter threshold is based on a sampling interval.

19. The method of claim 18, further comprising:
randomly selecting the sampling interval from values within a range.

20. The method of claim 18, wherein sampling entries stored in the branch trace buffer comprises:
reading the entries from the branch trace buffer after a predetermined period of time;
determining a number of entries read from the branch trace buffer during the predetermined period of time;
comparing the number of read entries to a predetermined number of entries to be collected during the predetermined period of time; and
adjusting the sampling interval in response to the number of read entries being greater than or less than the predetermined number of entries.

21. The method of claim 19, wherein the number of entries sampled from the branch trace buffer is a sample of a number of function calls executed for the function during a sampling interval, wherein a duration of the sampling interval is associated with the branch counter threshold.

22. An apparatus for determining call counts in a program without adding additional code into the program, comprising:
means for determining a sampling interval for sampling function calls in a program, wherein the function calls are for a function of a plurality of functions called in the program;
means for counting a number of executed function calls for the function in the program;
means for programming the means for counting to generate an interrupt upon the means for counting reaching a branch counter threshold, wherein the branch counter threshold is set to the sampling interval;
means for storing entries for the function calls of the function executed during the sampling interval;
means for sampling the entries only for the function calls of the function from the means for storing in response to the interrupt generated by the means for counting; and
means for determining call counts for the function based on the sampling of the entries.

23. The apparatus of claim 22, further comprising:
means for adjusting the sampling interval based on whether a function call sampling rate is equal to a desired function call sampling rate for a predetermined period of time.

24. The method of claim 23, further comprising:
a second means for storing entries read from the means for storing over a plurality of sampling intervals.

25. The apparatus of claim 24, further comprising:
means for determining call counts in the program based on a number of entries stored in the second means for storing over a plurality of time periods.

26. An apparatus for determining call counts in a program without adding additional code into the program, comprising:

a branch trace buffer that stores entries for function calls executed in a program, wherein the function calls are for a function of a plurality of functions called in the program;

a branch counter that is programmed to count a number of executed function calls for the function in the program and to generate an interrupt upon reaching a predetermined period of time; and a processor that samples the entries only from the function calls for the function in the branch trace buffer in response to the interrupt and that determines call counts of the function calls for the function from the sampled entries.

27. The apparatus of claim 26,
wherein the branch counter counts the number of executed function calls during a sampling interval.

28. The apparatus of claim 27, wherein the processor is operable to program the branch counter with a branch counter threshold to adjust the sampling interval.

29. The apparatus of claim 28, wherein the processor randomly determines the sampling interval within a range.

30. The apparatus of claim 29, wherein the range is based on whether a number of collected entries from the branch trace buffer is equally to a predetermined number of entries.

31. A non-transitory computer readable medium storing machine readable instructions that are executable by a processor to implement a method of determining call counts in a program without adding additional code into the program, the machine readable instructions comprising instructions to:

randomly determine a length of a plurality sampling intervals;

use a branch counter to count a number of executed function calls for a function in the program and to generate an interrupt upon reaching the length of the plurality sampling intervals, wherein the function is a function of a plurality of functions called in the program;

sample function calls from the function calls only for the function called in the program in response to the interrupt during the plurality of sampling intervals; and determine, for the function, call counts of function calls in the program based on the sampled function calls.

32. The computer readable medium of claim 31, wherein randomly determining a length of a plurality sampling intervals further comprises:

randomly determining each length within a predetermined range, wherein the predetermined range varies based on a number of function calls collected during a predetermined period of time.

33. The computer readable medium of claim 31, wherein sampling function calls during the plurality of sampling intervals further comprises:

sampling function calls during the plurality of sampling intervals, wherein the functions calls are sampled using a branch trace buffer.

* * * * *

UNITED STATES PATENT AND TRADEMARK OFFICE
CERTIFICATE OF CORRECTION

PATENT NO. : 8,214,819 B2
APPLICATION NO. : 10/886705
DATED : July 3, 2012
INVENTOR(S) : David Mosberger Page 1 of 1

It is certified that error appears in the above-identified patent and that said Letters Patent is hereby corrected as shown below:

In the Claims

In column 9, line 55, in Claim 16, delete "functions" and insert -- function --, therefor.

In column 10, line 59, in Claim 24, delete "method" and insert -- apparatus --, therefor.

In column 12, line 3, in Claim 31, delete "plurality sampling" and insert -- plurality of sampling --, therefor.

In column 12, lines 7-8, in Claim 31, delete "plurality sampling" and insert -- plurality of sampling --, therefor.

In column 12, line 16, in Claim 32, delete "plurality sampling" and insert -- plurality of sampling --, therefor.

In column 12, line 26, in Claim 33, delete "functions" and insert -- function --, therefor.

Signed and Sealed this
Thirteenth Day of August, 2013

Teresa Stanek Rea
*Acting Director of the United States Patent and Trademark Office*